J. A. HEDBERG & F. O. SVENSSON.
ADJUSTING DEVICE FOR WINDOW BLINDS.
APPLICATION FILED OCT. 11, 1911.

1,055,038.

Patented Mar. 4, 1913.

UNITED STATES PATENT OFFICE.

JAKOB AUGUST HEDBERG AND FRITZ OSCAR SVENSSON, OF GOTTENBORG, SWEDEN; SAID SVENSSON ASSIGNOR TO SAID HEDBERG.

ADJUSTING DEVICE FOR WINDOW-BLINDS.

1,055,038.  Specification of Letters Patent.  Patented Mar. 4, 1913.

Application filed October 11, 1911. Serial No. 654,109.

*To all whom it may concern:*

Be it known that we, JAKOB AUGUST HEDBERG, a subject of the King of Sweden, and resident of Odenplatsen 3, Gottenborg, in the Kingdom of Sweden, and FRITZ OSCAR SVENSSON, a subject of the King of Sweden, and resident of Rantorget 4, Gårda, Gottenborg, in the Kingdom of Sweden, have invented certain new and useful Improvements in Adjusting Devices for Window-Blinds, of which the following is a specification, reference being had therein to the accompanying drawing.

This invention relates to means for holding the ribs of window blinds in the oblique position into which they have been adjusted. The said means consist of a wheel or circular disk, which is connected with the top lath of the blind and is carried by two supports so arranged, that the said wheel is forced by the weight of the blind into the space between the supports and jammed between the same and thus braked in adjusted position.

A form of the invention is shown as an example in the accompanying drawing.

Figure 1:
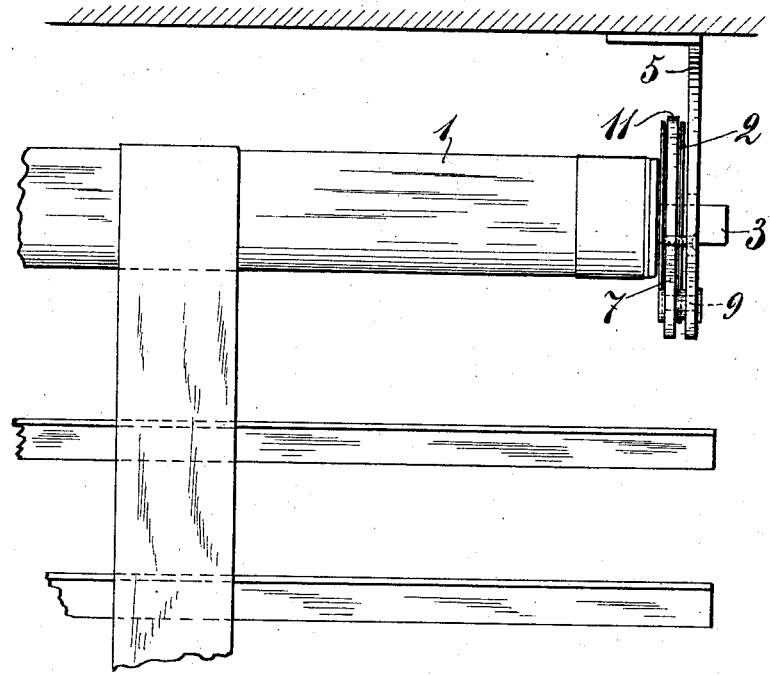
Figure 2:
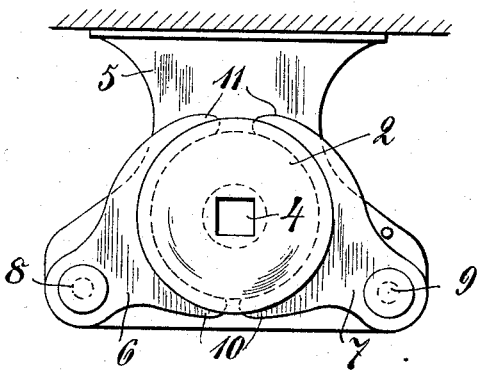

Figure 1 is a front view of a blind provided with the locking device. Fig. 2 is a side view of the locking device.

A wheel 2 is suitably connected with one end of the top lath 1 of the blind. In the form shown in the drawing the said connection is effected by a square pin 3 fixed in the end of the top lath being passed through a correspondingly shaped opening 4 provided in the center of the wheel. The wheel is carried by two supports, which are provided on a suitable mounting 5 and against which the wheel bears with its periphery. The said supports consist in the drawing of two claw shaped arms 6 and 7 bearing against the periphery of the wheel and being adapted to swing toward and from each other around pins 8 and 9 respectively, fixed in the said mounting 5. The said pins or pivots 8 and 9 are located below the center of the wheel. Each of the claw shaped arms 6 and 7 comprises two fingers 10 and 11, forming together a substantially semicircular part, bearing against the periphery of the wheel. The lower fingers 10 support the wheel, while the fingers 11 bear against the sides and the top part of the periphery of the wheel. The weight of the blind tends to force the wheel downward and the pressure of the wheel on the fingers 10 tends to swing the arms 6, 7, so that their fingers, which act upon the periphery of the wheel, are forced against the wheel and jam or brake the same in a degree corresponding to the weight of the blind. In this manner the wheel is braked in every position, so that the wheel and the blind are always held in the adjusted position.

Having now described our invention, what we claim as new and desire to secure by Letters Patent is:

1. In a locking device for window blinds the combination of a wheel connected with the top lath of the blind and two movable supports against which the said wheel bears at its periphery, said supports being forced into engagement with said wheel by the weight of the blind whereby said wheel is jammed between the supports and held in adjusted position.

2. In a locking device for blinds the combination of a wheel connected with the top lath of the blind, a support and two claw shaped arms, bearing against the periphery of the wheel and pivoted to said support said arms being forced by the weight of the blind into engagement with the periphery of the wheel whereby the wheel and the blind will be held in adjusted position.

3. In a locking device for window blinds, the combination of a wheel connected with the top lath of the blind, a stationary support, two positively disposed claw shaped arms pivotally connected to said support at a point below the axis of the wheel whereby the weight of the blind will jam said wheel between said arms, thereby holding the wheel of the blind in adjusted position.

In witness whereof, we have hereunto signed our names in the presence of two subscribing witnesses.

JAKOB AUGUST HEDBERG.
FRITZ OSCAR SVENSSON.

Witnesses:
ARTHUR MEYER,
CHARLES V. BLOCH.

Copies of this patent may be obtained for five cents each, by addressing the "Commissioner of Patents, Washington, D. C."